O. HOLMES.
Thrashing Machine.

No. 46,108.

Patented Jan'y 31, 1865.

UNITED STATES PATENT OFFICE.

ORSAMUS HOLMES, OF NEW LENOX, ILLINOIS.

IMPROVEMENT IN THRASHING-MACHINES.

Specification forming part of Letters Patent No. 46,108, dated January 31, 1865.

*To all whom it may concern:*

Be it known that I, ORSAMUS HOLMES, of New Lenox, in the county of Will and State of Illinois, have invented a new and Improved Separating Attachment for Thrashing-Machines; and I do hereby declare that the following is a full, clear, and exact description thereof, which will enable others skilled in the art to make and use the same, reference being had to the accompanying drawings, forming part of this specification, in which—

Figure 1:
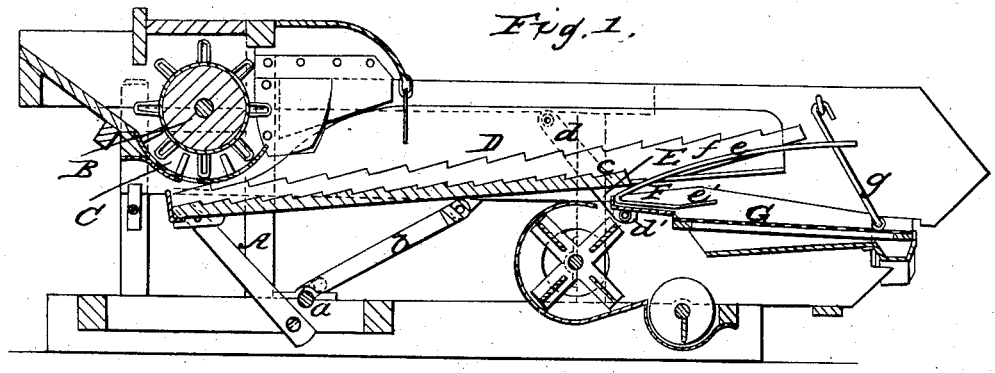
Figure 2:
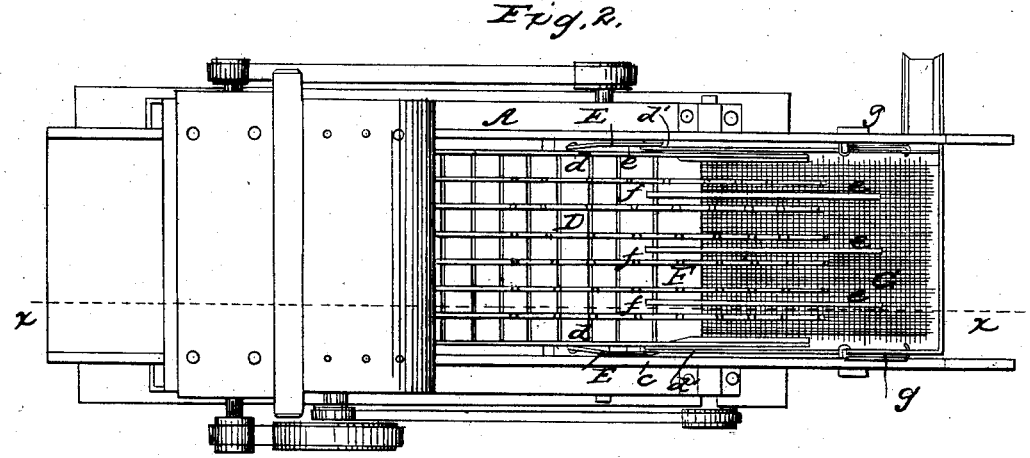
Figure 3:
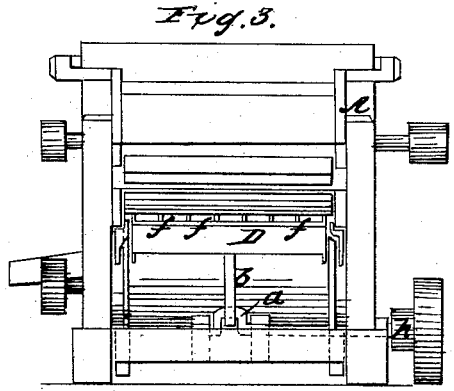

Figure 1 is a longitudinal vertical section of my invention, taken in the line $x\,x$, Fig. 2; Fig. 2, a plan or top view of the same; Fig. 3, an end view of the same.

Similar letters of reference indicate like parts.

This invention relates to a new and improved shaking or agitating device to be applied to grain-thrashing machines for the purpose of separating the loose grain from the straw and enabling the grain and straw to be discharged separately from the machine.

A represents the frame of a thrashing-machine; B, the thrashing-cylinder; C, the concave, and D the straw-carrier. These parts—except D, the straw-carrier—may be constructed in the usual way, and therefore do not require a minute description.

The straw-carrier D has a longitudinal shake and tossing motion communicated to it by means of a crank, $a$, and pitman $b$. The front part of the carrier D is suspended on two levers, E E, one at each side, said levers being pivoted near their centers to the framing A, as shown at $c$ in Fig. 1, the upper ends of the levers being attached to the sides of the carrier, as shown at $d$. The lower ends of the levers E E are connected by pivots $d'$ to a shoe, F, at the rear of a grain-screen, G, and this shoe has two sets of wires or rods, $e\,e'$, projecting from it, one set extending forward and upward between the outer ends of the toothed plates $f$ of the carrier D, and the other set extending forward a short distance over the rear part of the screen G. (See Figs. 1 and 2.) The front part of the screen G is suspended on rods $g\,g$, one at each side. The crank $a$, which operates the carrier D, is on a shaft, $h$, which is driven from the thrashing-cylinder B by means of a belt.

From the above description it will be seen that the carrier D, through the medium of the levers E E, communicates a shake motion to the screen G and shoe F, and that the upper wires or rods, $e$, will toss and loosen up the straw, causing the loose grain, even if the straw be damp, to fall out upon the screen G while the straw is discharged freely over the screen. The lower rods, $e'$, shake or toss the short straw. Thus by this simple means the grain is effectually separated from the loose straw.

I claim as new and desire to secure by Letters Patent—

The giving of a longitudinal shake and tossing motion to the straw-carrier D by a pitman, $b$, and crank, $a$, also the connecting of the grain-screen G to the carrier D through the medium of the levers E E, arranged as shown, in combination with the straw shoe F, attached to the rear of the screen G and provided with wires or rods $e\,e'$, substantially as and for the purpose herein set forth.

ORSAMUS HOLMES.

Witnesses:
MILLIS KNICKERBOCKER,
D. HAYER.